US012071545B2

(12) United States Patent
Deparis et al.

(10) Patent No.: US 12,071,545 B2
(45) Date of Patent: Aug. 27, 2024

(54) HIGH-MODULUS RUBBER COMPOSITION COMPRISING A VULCANIZATION ULTRA-ACCELERATOR

(71) Applicant: COMPAGNIE GENERALE DES ETABLISSEMENTS MICHELIN, Clermont-Ferrand (FR)

(72) Inventors: Xavier Deparis, Clermont-Ferrand (FR); Salvatore Pagano, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 724 days.

(21) Appl. No.: 16/768,400

(22) PCT Filed: Nov. 28, 2018

(86) PCT No.: PCT/FR2018/053029
§ 371 (c)(1),
(2) Date: May 29, 2020

(87) PCT Pub. No.: WO2019/106294
PCT Pub. Date: Jun. 6, 2019

(65) Prior Publication Data
US 2020/0317892 A1    Oct. 8, 2020

(30) Foreign Application Priority Data
Nov. 30, 2017    (FR) ........................................ 1761394

(51) Int. Cl.
| *C08L 9/06* | (2006.01) |
| *B60C 1/00* | (2006.01) |
| *C08L 7/00* | (2006.01) |
| C08K 3/04 | (2006.01) |
| C08K 3/06 | (2006.01) |
| C08K 5/21 | (2006.01) |
| C08K 5/44 | (2006.01) |
| C08K 5/47 | (2006.01) |
| C08L 61/06 | (2006.01) |
| C08L 63/00 | (2006.01) |
| C08L 93/04 | (2006.01) |

(52) U.S. Cl.
CPC .............. *C08L 9/06* (2013.01); *B60C 1/0016* (2013.01); *C08L 7/00* (2013.01); *C08K 3/04* (2013.01); *C08K 3/06* (2013.01); *C08K 5/21* (2013.01); *C08K 5/44* (2013.01); *C08K 5/47* (2013.01); *C08L 61/06* (2013.01); *C08L 63/00* (2013.01); *C08L 93/04* (2013.01)

(58) Field of Classification Search
CPC ..... C08L 9/06; C08L 7/00; C08L 61/06; C08L 63/00; C08L 93/04; B60C 1/0016; C08K 3/04; C08K 3/06; C08K 5/21; C08K 5/44; C08K 5/47
USPC ........................................................ 523/156
See application file for complete search history.

(56) References Cited

U.S. PATENT DOCUMENTS

| 5,977,238 A | 11/1999 | Labauze |
| 6,013,718 A | 1/2000 | Cabioch et al. |
| 6,120,911 A | 9/2000 | Beers et al. |
| 6,503,973 B2 | 1/2003 | Robert et al. |
| 6,610,261 B1 | 8/2003 | Custodero et al. |
| 6,747,087 B2 | 6/2004 | Custodero et al. |
| 6,774,255 B1 | 8/2004 | Tardivat et al. |
| 6,815,473 B2 | 11/2004 | Robert et al. |
| 6,849,754 B2 | 2/2005 | Deschler et al. |
| 7,199,175 B2 | 4/2007 | Vasseur |
| 7,217,751 B2 | 5/2007 | Durel et al. |
| 7,250,463 B2 | 7/2007 | Durel et al. |
| 7,259,205 B1 | 8/2007 | Pagliarini et al. |
| 7,312,264 B2 | 12/2007 | Gandon-Pain |
| 7,488,768 B2 | 2/2009 | Tardivat et al. |
| 7,820,771 B2 | 10/2010 | Lapra et al. |
| 7,900,667 B2 | 3/2011 | Vasseur |
| 8,277,590 B2 | 10/2012 | Delfino et al. |
| 8,344,063 B2 | 1/2013 | Marechal et al. |
| 8,389,612 B2 | 3/2013 | Miyazaki |
| 8,455,584 B2 | 6/2013 | Robert et al. |
| 8,461,269 B2 | 6/2013 | Varagniat et al. |
| 8,492,475 B2 | 7/2013 | Araujo Da Silva et al. |
| 8,492,479 B2 | 7/2013 | Robert et al. |
| 8,883,929 B2 | 11/2014 | Gandon-Pain et al. |

(Continued)

FOREIGN PATENT DOCUMENTS

| CN | 104487503 A | 4/2015 |
| CN | 105131356 A | 12/2015 |

(Continued)

OTHER PUBLICATIONS

International Search Report dated Mar. 21, 2019, in corresponding PCT/FR2018/053029 (4 pages).

(Continued)

Primary Examiner — Ling Siu Choi
Assistant Examiner — Ronald Grinsted
(74) Attorney, Agent, or Firm — VENABLE LLP

(57) ABSTRACT

A high-modulus rubber composition is based on at least a diene elastomer, a reinforcing filler, from 1 to 45 phr of reinforcing resin, from 1 to 10 phr of sulfur, and from 0.5 to 15 phr of vulcanization accelerator having a vulcanization initiation time, referred to as "t0", of less than 3 minutes, said composition comprising no vulcanization accelerator having a "t0" of greater than or equal to 3 minutes or comprising less than 2 phr thereof.

18 Claims, No Drawings

(56) References Cited

U.S. PATENT DOCUMENTS

| | | |
|---|---|---|
| 8,957,155 B2 | 2/2015 | Seeboth et al. |
| 9,010,393 B2 | 4/2015 | Araujo Da Silva et al. |
| 9,145,494 B2 | 9/2015 | Veyland et al. |
| 9,387,737 B2 | 7/2016 | Welter et al. |
| 9,670,291 B2 | 6/2017 | Marechal et al. |
| 9,714,339 B2 | 7/2017 | Veyland et al. |
| 10,040,976 B2 | 8/2018 | Doisneau et al. |
| 2001/0036991 A1 | 11/2001 | Robert et al. |
| 2002/0042465 A1 | 4/2002 | Migliarini et al. |
| 2002/0183436 A1 | 12/2002 | Robert et al. |
| 2003/0212185 A1 | 11/2003 | Vasseur |
| 2004/0051210 A1 | 3/2004 | Tardivat et al. |
| 2004/0132880 A1 | 7/2004 | Durel et al. |
| 2005/0004297 A1 | 1/2005 | Durel et al. |
| 2006/0089445 A1 | 4/2006 | Gandon-Pain |
| 2007/0112120 A1 | 5/2007 | Vasseur |
| 2008/0132644 A1 | 6/2008 | Lapra et al. |
| 2009/0186961 A1 | 7/2009 | Araujo Da Silva et al. |
| 2009/0209709 A1 | 8/2009 | Araujo Da Silva et al. |
| 2009/0234066 A1 | 9/2009 | Araujo Da Silva et al. |
| 2009/0270558 A1 | 10/2009 | Gandon-pain et al. |
| 2010/0022714 A1 | 1/2010 | Varagniat et al. |
| 2010/0036019 A1 | 2/2010 | Miyazaki |
| 2010/0145089 A1 | 6/2010 | Mignani et al. |
| 2010/0181006 A1 | 7/2010 | Delfino et al. |
| 2010/0184912 A1 | 7/2010 | Marechal et al. |
| 2010/0249270 A1 | 9/2010 | Robert et al. |
| 2010/0252156 A1 | 10/2010 | Robert et al. |
| 2011/0021702 A1 | 1/2011 | Gandon-Pain et al. |
| 2011/0152458 A1 | 6/2011 | Araujo Da Silva et al. |
| 2011/0294953 A1 | 12/2011 | Seeboth et al. |
| 2012/0208948 A1 | 8/2012 | Gandon-Pain et al. |
| 2012/0252928 A1 | 10/2012 | Marechal et al. |
| 2012/0283360 A1 | 11/2012 | Veyland et al. |
| 2012/0283372 A1 | 11/2012 | Veyland et al. |
| 2013/0303657 A1 | 11/2013 | Miyazaki |
| 2014/0031487 A1 | 1/2014 | Guy et al. |
| 2014/0235125 A1 | 8/2014 | Doisneau et al. |
| 2014/0350138 A1 | 11/2014 | Cladiere et al. |
| 2015/0183983 A1 | 7/2015 | Veyland et al. |
| 2016/0039258 A1 | 2/2016 | Welter et al. |
| 2020/0385559 A1 | 12/2020 | Deparis et al. |

FOREIGN PATENT DOCUMENTS

| | | | |
|---|---|---|---|
| CN | 105315524 A | * | 2/2016 |
| CN | 105315524 A | | 2/2016 |
| EP | 0901914 A1 | | 3/1999 |
| EP | 1127909 A1 | | 8/2001 |
| EP | 2159074 A1 | | 3/2010 |
| EP | 2662405 A1 | | 11/2013 |
| EP | 2 982 525 A1 | | 2/2016 |
| FR | 2740778 A1 | | 5/1997 |
| FR | 2765882 A1 | | 1/1999 |
| JP | 2011-42767 A | | 3/2011 |
| NO | 2006/125534 A1 | | 11/2006 |
| WO | 97/36724 A2 | | 10/1997 |
| WO | 99/09036 A1 | | 2/1999 |
| WO | 99/16600 A1 | | 4/1999 |
| WO | 01/92402 A1 | | 12/2001 |
| WO | 02/10269 A2 | | 2/2002 |
| WO | 02/30939 A1 | | 4/2002 |
| WO | 02/31041 A1 | | 4/2002 |
| WO | 02/083782 A1 | | 10/2002 |
| WO | 03/016387 A1 | | 2/2003 |
| WO | 2004/096865 A2 | | 11/2004 |
| WO | 2006/023815 A2 | | 3/2006 |
| WO | 2006/069792 A1 | | 7/2006 |
| WO | 2006/069793 A1 | | 7/2006 |
| WO | 2006/125532 A1 | | 11/2006 |
| WO | 2006/125533 A1 | | 11/2006 |
| WO | 2007/061550 A1 | | 5/2007 |
| WO | 2007/098080 A2 | | 8/2007 |
| WO | 2008/003434 A1 | | 1/2008 |
| WO | 2008/003435 A1 | | 1/2008 |
| WO | 2008/055986 A2 | | 5/2008 |
| WO | 2008/080535 A1 | | 7/2008 |
| WO | 2008/141702 A1 | | 11/2008 |
| WO | 2009/000750 A1 | | 12/2008 |
| WO | 2009/000752 A1 | | 12/2008 |
| WO | 2010/072685 A1 | | 7/2010 |
| WO | 2011/029938 A1 | | 3/2011 |
| WO | 2011/042507 A1 | | 4/2011 |
| WO | 2012/059529 A1 | | 5/2012 |
| WO | 2013/017422 A1 | | 2/2013 |
| WO | 2013/040425 A1 | | 3/2013 |
| WO | 2013/092096 A1 | | 6/2013 |
| WO | 2014/016344 A1 | | 1/2014 |
| WO | 2014/016346 A1 | | 1/2014 |

OTHER PUBLICATIONS

S. Brunauer, et al., "Adsorption of Gases in Multimolecular Layers", J. Am. Chem. Soc., vol. 60, pp. 309-319 (1938).

R. Mildenberg, et al., Hydrocarbon Resins, VCH, New York, chapter 5.5, pp. 141-146 (1997).

* cited by examiner

HIGH-MODULUS RUBBER COMPOSITION COMPRISING A VULCANIZATION ULTRA-ACCELERATOR

BACKGROUND

The invention relates to high-modulus, diene elastomer-based rubber compositions for tyres, in particular for tyre treads.

The stiffness, in particular that of the tread or the crown portion of a tyre, contributes to the drift thrust of the tyre, which is transposable to the road handling.

To obtain high stiffnesses, it has been proposed to introduce large amounts of filler into the composition. However, this solution has an impact on the rolling resistance and also on the endurance of the tyre owing to high heating. In point of fact, it is an ongoing aim to limit the rolling resistance of tyres in order to reduce the fuel consumption and thus to protect the environment.

More conventionally, in the area of the lower region of the tyres, the stiffness may be increased by incorporating reinforcing resins based on a methylene acceptor/donor system. In this type of formulation, the degree of stiffness is dependent on the amount of methylene acceptor/donor. However, industrially, the use of a large proportion of a methylene acceptor/donor may lead to certain production constraints on an industrial level. Increasing the stiffness of rubber composition without increasing the amounts of reinforcing resin used remains a true technical problem.

There is therefore a real need to further increase the stiffness of compositions for tyres, in particular for tyre treads, preferably without detrimentally affecting the other properties of the tyre, in particular of the tyre tread, or the processing from an industrial point of view (processability).

In the pursuit of their research, the applicant has discovered that the use of a vulcanization system comprising a vulcanization ultra-accelerator makes it possible to increase the stiffness of a rubber composition comprising a reinforcing resin, doing so with a constant amount of reinforcing resin and of sulfur.

SUMMARY

Thus, one subject of the present invention is in particular a rubber composition based on at least:
  a diene elastomer,
  a reinforcing filler,
  1 to 45 phr of reinforcing resin,
  from 1 to 10 phr of sulfur,
  from 0.5 to 15 phr, preferably from 2 to 15 phr, of vulcanization accelerator having a vulcanization initiation time, referred to as "t0", of less than 3 minutes, said composition comprising no vulcanization accelerator having a "t0" of greater than or equal to 3 minutes or comprising less than 2 phr thereof.

Another subject of the invention is finished or semi-finished rubber articles for tyres and tyres comprising a rubber composition in accordance with the invention.

The invention and its advantages will be easily understood in the light of the following description and exemplary embodiments.

I—DEFINITIONS

The expression "part by weight per hundred parts by weight of elastomer" (or phr) should be understood as meaning, within the meaning of the present invention, the part by weight per hundred parts by weight of elastomer or rubber.

In the present document, unless expressly indicated otherwise, all the percentages (%) shown are percentages (%) by weight.

Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b). In the present document, when an interval of values is denoted by the expression "from a to b", the interval represented by the expression "between a and b" is also and preferentially denoted.

In the present document, the expression composition "based on" is understood to mean a composition comprising the mixture and/or the reaction product of the various constituents used, some of these base constituents being capable of reacting or intended to react with one another, at least in part, during the various phases of manufacture of the composition, in particular during the crosslinking or vulcanization thereof. By way of example, a composition based on an elastomeric matrix and on sulfur comprises the elastomeric matrix and the sulfur before curing, whereas, after curing, the sulfur is no longer detectable as the latter has reacted with the elastomeric matrix with the formation of sulfur (polysulfide, disulfide, monosulfide) bridges.

When reference is made to a "predominant" compound, this is understood to mean, within the meaning of the present invention, that this compound is predominant among the compounds of the same type in the composition, that is to say that it is the one which represents the greatest amount by weight among the compounds of the same type, for example more than 50%, 60%, 70%, 80%, 90%, indeed even 100%, by weight, with respect to the total weight of the compound type. Thus, for example, a predominant reinforcing filler is the reinforcing filler representing the greatest weight with respect to the total weight of the reinforcing fillers in the composition. On the contrary, a "minor" compound is a compound which does not represent the greatest fraction by weight among the compounds of the same type, for example less than 50%, 40%, 30%, 20%, 10%, indeed even less.

Within the context of the invention, the carbon-based products mentioned in the description can be of fossil or biobased origin. In the latter case, they can partially or completely result from biomass or be obtained from renewable starting materials resulting from biomass. Polymers, plasticizers, fillers and the like are concerned in particular.

II— DESCRIPTION OF THE INVENTION

II-1 Diene Elastomer

The composition according to the invention is based on at least one diene elastomer. It may contain just one diene elastomer or a mixture of several diene elastomers.

It should be remembered here that elastomer (or "rubber", the two terms being regarded as synonymous) of the "diene" type should be understood, in a known way, to mean an (one or more is understood) elastomer resulting at least in part (i.e., a homopolymer or a copolymer) from diene monomers (monomers bearing two conjugated or non-conjugated carbon-carbon double bonds).

Diene elastomers can be classified in two categories: "essentially unsaturated" or "essentially saturated". "Essentially unsaturated" is generally understood to mean a diene elastomer resulting at least in part from conjugated diene monomers having a content of units of diene origin (conjugated dienes) which is greater than 15% (mol %); thus, diene elastomers such as butyl rubbers or copolymers of dienes and of α-olefins of EPDM type do not fall under the preceding definition and may especially be termed "essentially saturated" diene elastomers (low or very low content, always less than 15%, of units of diene origin). In the category of "essentially unsaturated" diene elastomers, a "highly unsaturated" diene elastomer is understood in particular to mean a diene elastomer having a content of units of diene origin (conjugated dienes) which is greater than 50%.

Given these definitions, diene elastomer capable of being used in the compositions according to the invention is understood more particularly to mean:

a) any homopolymer obtained by polymerization of a conjugated diene monomer having from 4 to 12 carbon atoms;

b) any copolymer obtained by copolymerization of one or more conjugated dienes with one another or with one or more vinylaromatic compounds having from 8 to 20 carbon atoms;

c) a ternary copolymer obtained by copolymerization of ethylene and of an α-olefin having from 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, in particular, 1,4-hexadiene, ethylidenenorbornene or dicyclopentadiene;

d) a copolymer of isobutene and of isoprene (butyl rubber) and also the halogenated versions, in particular chlorinated or brominated versions, of this type of copolymer.

Although it applies to any type of diene elastomer, a person skilled in the art of tyres will understand that the present invention is preferably employed with essentially unsaturated diene elastomers, in particular of the above type (a) or (b).

The following are suitable in particular as conjugated diener: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene.

The copolymers can contain between 99% and 20% by weight of diene units and between 1% and 80% by weight of vinylaromatic units. The elastomers can have any microstructure, which depends on the polymerization conditions used, in particular on the presence or absence of a modifying and/or randomizing agent and on the amounts of modifying and/or randomizing agent employed. The elastomers can, for example, be random, sequential or microsequential elastomers and can be prepared in dispersion or in solution; they can be coupled and/or star-branched or else functionalized with a coupling and/or star-branching or functionalizing agent. Mention may be made, for example, for coupling to carbon black, of functional groups comprising a C—Sn bond or amino functional groups, such as aminobenzophenone, for example; mention may be made, for example, for coupling to a reinforcing inorganic filler, such as silica, of silanol functional groups or polysiloxane functional groups having a silanol end (such as described, for example, in FR 2 740 778, U.S. Pat. No. 6,013,718 and WO 2008/141702), alkoxysilane groups (such as described, for example, in FR 2 765 882 or U.S. Pat. No. 5,977,238), carboxyl groups (such as described, for example, in WO 01/92402 or U.S. Pat. No. 6,815,473, WO 2004/096865 or US 2006/0089445) or also polyether groups (such as described, for example, in EP 1 127 909, U.S. Pat. No. 6,503,973, WO 2009/000750 and WO 2009/000752). Mention may also be made, as other examples of functionalized elastomers, of elastomers (such as SBR, BR, NR or IR) of the epoxidized type.

These functionalized elastomers can be used as a blend with one another or with non-functionalized elastomers. For example, it is possible to use a silanol- or polysiloxane-functionalized elastomer having a silanol end, in a mixture with an elastomer coupled and/or star-branched with tin (described in WO 11/042507), the latter representing a content of 5% to 50%, for example of 25% to 50%.

The following are suitable: polybutadienes and in particular those having a content (mol %) of 1,2-units of between 4% and 80% or those having a content (mol %) of cis-1,4-units of greater than 80%, polyisoprenes, butadiene/styrene copolymers and in particular those having a Tg (glass transition temperature—Tg, measured according to ASTM D3418) of between 0° C. and −70° C. and more particularly between −10° C. and −60° C., a styrene content of between 5% and 60% by weight and more particularly between 20% and 50%, a content (mol %) of 1,2-bonds of the butadiene part of between 4% and 75% and a content (mol %) of trans-1,4-bonds of between 10% and 80%, butadiene/isoprene copolymers and especially those having an isoprene content of between 5% and 90% by weight and a Tg of −40° C. to −80° C., or isoprene/styrene copolymers and especially those having a styrene content of between 5% and 50% by weight and a Tg of between −5° C. and −60° C. In the case of butadiene/styrene/isoprene copolymers, those having a styrene content of between 5% and 50% by weight and more particularly of between 10% and 40%, an isoprene content of between 15% and 60% by weight and more particularly of between 20% and 50%, a butadiene content of between 5% and 50% by weight and more particularly of between 20% and 40%, a content (mol %) of 1,2-units of the butadiene part of between 4% and 85%, a content (mol %) of trans-1,4-units of the butadiene part of between 6% and 80%, a content (mol %) of 1,2-plus 3,4-units of the isoprene part of between 5% and 70% and a content (mol %) of trans-1,4-units of the isoprene part of between 10% and 50%, and more generally any butadiene/styrene/isoprene copolymer having a Tg of between −20° C. and −70° C., are suitable in particular.

To summarize, the diene elastomer of the composition is preferentially selected from the group of highly unsaturated diene elastomers consisting of polybutadienes (abbreviated to "BRs"), synthetic polyisoprenes (IRs), natural rubber (NR), butadiene copolymers, isoprene copolymers and the mixtures of these elastomers. Such copolymers are more preferentially selected from the group consisting of butadiene/styrene copolymers (SBRs), isoprene/butadiene copolymers (BIRs), isoprene/styrene copolymers (SIRS), isoprene/butadiene/styrene copolymers (SBIRs), butadiene/acrylonitrile copolymers (NBRs), butadiene/styrene/acrylonitrile copolymers (NSBRs) or a mixture of two or more of these compounds.

More preferentially, the diene elastomer of the composition is selected from the group of highly unsaturated diene elastomers consisting of polybutadienes (BRs), butadiene/styrene copolymers (SBRs), natural rubber (NR) and the mixtures of these elastomers.

Advantageously, the diene elastomer predominantly consists of a styrene/butadiene copolymer (abbreviated to SBR), it being possible for this SBR to be an emulsion SBR or ESBR (that is to say, prepared by emulsion polymerization), a solution SBR or SSBR (that is to say, prepared by solution polymerization) or a mixture of the two.

Mention may in particular be made, among copolymers based on styrene and butadiene, especially SBR, of those having a styrene content of between 5% and 60% by weight and more particularly between 20% and 50%, a content (mol %) of 1,2-bonds of the butadiene part of between 4% and 75%, and a content (mol %) of trans-1,4-bonds of between 10% and 80%.

Preferably, the Tg of the copolymer based on styrene and butadiene, in particular SBR (ESBR or SSBR), is between 0° C. and −80° C., more particularly between 0° C. and −70° C.; according to a specific embodiment, the Tg is between −5° C. and −60° C., in particular within a range from −10° C. to −50° C. A person skilled in the art knows how to modify the microstructure of a copolymer based on styrene and butadiene, in particular of an SBR, in order to increase and adjust its Tg, in particular by varying the contents of styrene, of 1,2-bonds or of trans-1,4-bonds of the butadiene part.

The composition according to the invention does not necessitate the use of a thermoplastic elastomer to further increase the stiffness of the composition. Thus, the composition according to the invention does not contain a thermoplastic elastomer or contains less than 10 phr, preferably less than 5 phr, thereof.

The term "thermoplastic elastomer (TPE)" is intended to mean, in a known manner, a polymer with a structure that is intermediate between a thermoplastic polymer and an elastomer. A thermoplastic elastomer is formed of one or more rigid "thermoplastic" segments connected to one or more flexible "elastomer" segments.

II-2 Reinforcing Filler

The composition according to the invention is also based on at least one reinforcing filler known for its ability to reinforce a rubber composition that can be used for the manufacture of tyres.

The physical state under which the reinforcing filler is provided is not important, whether in the form of a powder, of micropearls, of granules, of beads or any other appropriate densified form.

Such a reinforcing filler typically consists of particles, the (weight-)average size of which is less than a micrometre, generally less than 500 nm, most often between 20 and 200 nm, in particular and more preferentially between 20 and 150 nm.

The reinforcing filler of the composition according to the invention can comprise carbon black, an organic filler other than carbon black, an inorganic filler or the mixture of at least two of these fillers. Preferably, the reinforcing filler comprises a carbon black, a reinforcing inorganic filler or a mixture thereof. Preferably, the reinforcing inorganic filler is a silica. More preferentially still, the reinforcing filler predominantly comprises carbon black and, to a minor extent, an inorganic filler. The reinforcing filler can comprise, for example, from 50% to 100% by weight of carbon black, preferably from 55% to 90% by weight, preferably from 60% to 80% by weight. Particularly advantageously, the reinforcing filler comprises exclusively carbon black.

According to the invention, the content of reinforcing filler, preferably the reinforcing filler predominantly comprising carbon black, can be within a range extending from 20 to 200 phr, preferably from 30 to 150 phr, preferably from 50 to 120 phr.

The blacks which can be used in the context of the present invention can be any black conventionally used in tyres or their treads ("tyre-grade" blacks). Among the latter, mention will more particularly be made of the reinforcing carbon blacks of the 100, 200 and 300 series, or the blacks of the 500, 600 or 700 series (ASTM grades), such as, for example, the N115, N134, N234, N326, N330, N339, N347, N375, N550, N683 and N772 blacks. These carbon blacks can be used in the isolated state, as available commercially, or in any other form, for example as support for some of the rubber additives used. The carbon blacks might, for example, be already incorporated in the diene elastomer, in particular isoprene elastomer, in the form of a masterbatch (see, for example, Applications WO 97/36724 or WO 99/16600). The BET specific surface area of the carbon blacks is measured according to Standard D6556-10 [multipoint (a minimum of 5 points) method—gas: nitrogen—relative pressure $p/p_o$ range: 0.1 to 0.3].

Mention may be made, as examples of organic fillers other than carbon blacks, of functionalized polyvinyl organic fillers, such as described in Applications WO 2006/069792, WO 2006/069793, WO 2008/003434 and WO 2008/003435.

The term "reinforcing inorganic filler" should be understood here to mean any inorganic or mineral filler, regardless of its colour and its origin (natural or synthetic), also known as "white" filler, "clear" filler or even "non-black" filler, in contrast to carbon black, capable of reinforcing, by itself alone, without means other than an intermediate coupling agent, a rubber composition intended for the manufacture of pneumatic tyres, in other words capable of replacing, in its reinforcing role, a conventional tyre-grade carbon black; such a filler is generally characterized, in a known way, by the presence of hydroxyl (—OH) groups at its surface. In other words, without a coupling agent, the inorganic filler does not make it possible to reinforce, or to sufficiently reinforce, the composition and consequently does not come within the definition of "reinforcing inorganic filler".

Mineral fillers of the siliceous type, preferentially silica ($SiO_2$), are suitable in particular as reinforcing inorganic fillers. The silica used can be any reinforcing silica known to a person skilled in the art, in particular any precipitated or fumed silica exhibiting a BET specific surface area and also a CTAB specific surface area both of less than 450 $m^2/g$, preferably from 30 to 400 $m^2/g$, in particular between 60 and 300 $m^2/g$. Mention will be made, as highly dispersible precipitated silicas ("HDSs"), for example of the Ultrasil 7000 and Ultrasil 7005 silicas from Degussa, the Zeosil 1165MP, 1135MP and 1115MP silicas from Rhodia, the Hi-Sil EZ150G silica from PPG, the Zeopol 8715, 8745 and 8755 silicas from Huber or the silicas with a high specific surface area as described in Application WO 03/016387.

In the present account, as regards the silica, the BET specific surface area is determined in a known way by gas adsorption using the Brunauer-Emmett-Teller method described in *The Journal of the American Chemical Society*, Vol. 60, page 309, February 1938, more specifically according to French Standard NF ISO 9277 of December 1996 (multipoint (5 point) volumetric method—gas: nitrogen—degassing: 1 hour at 160° C.—relative pressure $p/p_o$ range: 0.05 to 0.17). The CTAB specific surface area is the external surface area determined according to French Standard NF T 45-007 of November 1987 (method B).

Mineral fillers of the aluminous type, in particular alumina ($Al_2O_3$) or aluminium (oxide) hydroxides, or also reinforcing titanium oxides, for example described in U.S. Pat. Nos. 6,610,261 and 6,747,087, are also suitable as reinforcing inorganic fillers. Of course, the term "reinforcing inorganic filler" is also understood to mean mixtures of different reinforcing inorganic fillers, in particular of highly dispersible siliceous and/or aluminous fillers as described above.

A person skilled in the art will understand that use might be made, as filler equivalent to the reinforcing inorganic filler described in the present section, of a reinforcing filler of another nature, in particular organic nature, provided that this reinforcing filler is covered with an inorganic layer, such as silica, or else includes, at its surface, functional sites, notably hydroxyl sites, requiring the use of a coupling agent in order to establish the bond between the filler and the elastomer.

In order to couple the reinforcing inorganic filler to the diene elastomer, use is made, in a well-known way, of an at least bifunctional coupling agent (or bonding agent) intended to provide a satisfactory connection, of chemical and/or physical nature, between the inorganic filler (surface of its particles) and the diene elastomer. Use is made in particular of organosilanes or polyorganosiloxanes which are at least bifunctional.

A person skilled in the art can find coupling agent examples in the following documents: WO 02/083782, WO 02/30939, WO 02/31041, WO 2007/061550, WO 2006/125532, WO 2006/125533, WO 2006/125534, U.S. Pat. No. 6,849,754, WO 99/09036, WO 2006/023815, WO 2007/098080, WO 2010/072685 and WO 2008/055986.

The content of coupling agent is advantageously less than 10 phr, it being understood that it is generally desirable to use as little as possible of it. Typically, when a reinforcing inorganic filler is present, the content of coupling agent represents from 0.5% to 15% by weight, relative to the amount of inorganic filler. Its content is preferentially within a range extending from 0.5 to 7.5 phr. This content is easily adjusted by a person skilled in the art depending on the content of inorganic filler used in the composition.

The rubber composition of the tyre according to the invention can also comprise, in addition to the coupling agents, coupling activators, agents for covering the inorganic fillers or more generally processing aids capable, in a known way, by virtue of an improvement in the dispersion of the filler in the rubber matrix and of a lowering in the viscosity of the compositions, of improving their ease of processing in the raw state, these processing aids being, for example, hydrolysable silanes, such as alkylalkoxysilanes (in particular alkyltriethoxysilanes), polyols, polyethers (for example, polyethylene glycols), trialkanolamines, hydroxylated or hydrolysable POSs, for example α,ω-dihydroxypolyorganosiloxanes (in particular α,ω-dihydroxypolydimethylsiloxanes), or fatty acids, such as, for example, stearic acid.

II-3 Reinforcing Resin

The composition according to the invention is also based on at least one reinforcing resin (or curing resin) known to a person skilled in the art for stiffening rubber compositions, in particular by increasing their Young's modulus or else the complex dynamic shear G*. Thus, a rubber composition to which a reinforcing resin has been added will exhibit a higher stiffness, in particular a Young's modulus or the complex dynamic shear G*, than this composition without reinforcing resin.

Those skilled in the art can measure the Young's modulus (also known as modulus of elasticity or else tensile modulus) of rubber compositions according to Standard ASTM 412-98a. or according to Standard NF EN ISO 527-2 (2012) on a test specimen of type A according to Standard DIN EN ISO 3167 (2014). They can also measure the complex dynamic shear G* on a viscosity analyser (Metravib VA4000), in a way well known to a person skilled in the art according to Standard ASTM D 5992-96, for example by recording the response of a sample of crosslinked composition (cylindrical test specimen with a thickness of 4 mm and a cross section of 400 $mm^2$), subjected to a simple alternating sinusoidal shear stress, at a frequency of 10 Hz, under the defined conditions of temperature (for example at 60° C.) according to Standard ASTM D 1349-99 or, as the case may be, at a different temperature. A strain amplitude sweep is carried out from 0.1% to 50% (outward cycle) and then from 50% to 0.1% (return cycle). For the return cycle, the complex dynamic shear modulus G* at a predetermined strain (for example 10%) is shown.

In this context, the increase in the stiffness is brought about by polymerization or crosslinking of the reinforcing resin so as to form, in the vast majority of cases, a three-dimensional network. This crosslinking most of the time requires the use of a co-agent (often called a curing agent) and/or of heating (at a temperature of greater than or equal to 100° C., indeed even of greater than or equal to 130° C.).

The content of reinforcing resin in the composition according to the invention is within a range extending from 1 to 45 phr. Advantageously, the comprises from 0.5 to 30 phr of a reinforcing resin and from 0.5 to 20 phr of a co-agent of the reinforcing resin.

The reinforcing resins commonly used are phenolic resins, epoxy resins, benzoxazine resins, bismaleimides, polyurethane resins, and the like.

The reinforcing resins conventionally used in rubber compositions for tyres are based on a methylene acceptor/donor system. The terms "methylene acceptor" and "methylene donor" are well known to a person skilled in the art and are widely used to denote compounds capable of reacting together (crosslinking). The crosslinking of the resin is brought about, during the curing of the rubber matrix, by the formation of methylene (—$CH_2$—) bridges between the carbons in the ortho and/or para positions of the phenolic rings of the resin and the methylene donor, thus creating a three-dimensional resin network which is superimposed on and interpenetrated with the reinforcing filler/elastomer network, on the one hand, and with the elastomer/sulfur network, on the other hand (if the crosslinking agent is sulfur). Examples of such methylene acceptor and donor are described in WO 02/10269.

There are many other reinforcing resins which can be used in the context of the present invention, if appropriate combined with a co-agent of the reinforcing resin. Mention may in particular be made, by way of example, of those described in Applications WO 2011/029938, WO 2008/080535, WO 2014/016346, WO2013/017422 or WO 2014/016344.

According to the invention, the reinforcing resin is preferably selected from the group comprising or consisting of phenolic resins, epoxy resins, benzoxazine resins, bismaleimides, polyurethane resins and mixtures thereof.

In a particularly advantageous way, the reinforcing resin is a phenolic resin selected from the group comprising or consisting of resins based on polyphenol, on alkylphenol, on aralkylphenol and mixtures thereof. Preferably, the reinforcing resin is a phenolic resin selected from the group comprising or consisting of resins based on hydroxybenzene, on bisphenol (preferably diphenylolpropane or diphenylolmethane), on naphthol, on cresol, on t-butylphenol, on octylphenol, on nonylphenol, on resorcinol, on phloroglucinol, on cardanol, on xylenol (in particular 3,5-xylenol), on 1-naphthol, on 2-naphthol, on 1,5-naphthalenediol, on 2,7-naphthalenediol, on pyrogallol, on 2-methylhydroquinone, on 4-methylcatechol, on 2-methylcatechol, on orcinol (5-methylbenzene-1,3-diol), on hydroquinone (benzene-1,4-diol) and on mixtures thereof.

The reinforcing resin can also be an epoxy resin selected from the group comprising or consisting of aromatic epoxy compounds, alicyclic epoxy compounds, aliphatic epoxy compounds and their mixtures; preferably, the reinforcing resin is an epoxy resin selected from the group comprising or consisting of 2,2-bis[4-(glycidyloxy)phenyl]propane, poly[(o-cresyl glycidyl ether)-co-formaldehyde], poly[(phenyl glycidyl ether)-co-formaldehyde], poly[(phenyl glycidyl ether)-co-(hydroxybenzaldehyde glycidyl ether)] and mixtures thereof.

The content of reinforcing resin in the composition is advantageously within a range extending from 0.5 to 30 phr, preferably from 2 to 20 phr, more preferably from 3 to 15 phr.

The reinforcing resins within the meaning of the present invention should not be confused with "plasticizing" hydrocarbon resins, which are by nature miscible (i.e. compatible) at the contents used with the polymer compositions for which they are intended, so as to act as true diluents. Plasticizing hydrocarbon resins have in particular been described, for example, in Application WO 2013/092096 or in the work entitled "Hydrocarbon Resins" by R. Mildenberg, M. Zander and G. Collin (New York, V C H, 1997, ISBN 3-527-28617-9), Chapter 5 of which is devoted to their applications, in particular in the tyre rubber field (5.5. "Rubber Tires and Mechanical Goods"). They can be aliphatic, cycloaliphatic, aromatic, hydrogenated aromatic or of the aliphatic/aromatic type.

According to the invention, the composition of the invention may further comprise a co-agent of the reinforcing resin (or curing agent). A person skilled in the art knows which co-agent to combine with which reinforcing resin based on his general knowledge or on the abovementioned documents.

According to the invention, the co-agent of the reinforcing resin can be selected from the group comprising or consisting of methylene donors, polyaldehydes, polyamines, polyimines, polyamines, polyaldimines, polyketimines, acid anhydrides and mixtures thereof.

When the reinforcing resin used is a phenolic resin, the co-agent of the reinforcing resin is preferably a methylene donor selected from the group comprising or consisting of hexamethylenetetramine, hexa(methoxymethyl)melamine, hexa(ethoxymethyl)melamine, paraformaldehyde polymers, N-methylol derivatives of melamine, and mixtures thereof, preferably from the group comprising or consisting of hexamethylenetetramine, hexa(methoxymethyl)melamine, hexa(ethoxymethyl)melamine and mixtures thereof.

When the reinforcing resin used is an epoxy resin, the co-agent of the reinforcing resin is preferably an amino curing agent selected from the group consisting of polyamines (in particular aliphatic polyamines, alicyclic polyamines, aliphatic amines and aromatic polyamines), dicyandiamides, hydrazides, imidazole compounds, sulfonium salts, onium salts, ketimines, acid anhydrides and mixtures thereof; preferably, the co-agent of the reinforcing resin is an amino curing agent selected from the group consisting of ethylenediamine, diethylenetriamine, triethylenetetramine, 1,8-diaminooctane, 1,3-bis(aminomethyl)cyclohexane, which m-xylylenediamine, p-xylylenediamine, m-phenylenediamine, 2,2-bis(4-aminophenyl)propane, diaminodiphenylmethane, 3,5-diethyl-2,4-diaminotoluene, 3,5-diethyl-2,6-diaminotoluene, methyl thio-toluene diamine, dimethyl thio-toluene diamine, diaminodiphenyl sulfone, 2,2'-bis(4-aminophenyl)-p-diisopropylbenzene, 3,3'-diaminobenzidine, 4,4'-(4,4'-isopropylidenediphenoxy) bis(phthalic anhydride) polyanhydride, pyromellitic dianhydride and mixtures thereof.

A person skilled in the art knows how to adjust the content of co-agent of the reinforcing resin as a function of the content of reinforcing resin used. Preferably, the content of co-agent of the reinforcing resin in the composition is within a range extending from 0.5 to 20 phr, preferably from 1 to 18 phr, more preferably from 2 to 15 phr. Thus, the composition according to the invention may comprise from 0.5 to 20 phr, preferably from 1 to 18 phr, more preferably from 2 to 15 phr, of a co-agent of the reinforcing resin.

II-4 Crosslinking System

The crosslinking system of the composition according to the invention is based on from 1 to 10 phr of sulfur and from 0.5 to 15 phr, preferably from 2 to 15 phr, of vulcanization accelerator having a vulcanization initiation time, referred to as "t0", of less than 3 minutes (also referred to as vulcanization ultra-accelerator) well known to those skilled in the art. The use of the term "ultra-accelerator" is known to denote a vulcanization accelerator having a shorter "t0" than a conventional vulcanization accelerator, where appropriate of less than 3 minutes.

According to the invention, the composition comprises no vulcanization accelerator having a "t0" of greater than or equal to 3 minutes or comprises less than 2 phr thereof.

The sulfur may be in the form of molecular sulfur and/or sulfur donor. As an example of a sulfur donor, mention may in particular be made of dipentamethylenethiuram tetrasulfide (DPTT), polymeric sulfur or caprolactam disulfide (CLD).

Advantageously, the content of sulfur in the composition according to the invention is within a range extending from 1 to 8 phr, preferably from 2 to 8 phr, preferably from 3 to 7 phr, preferably from 4 to 6 phr.

Generally, the vulcanization accelerators may be classified into several categories depending on whether they enable a more or less rapid initiation of the vulcanization. This initiation of the vulcanization may be represented by the "t0" value of the accelerator.

The t0 value for a given accelerator must be measured in a given rubber composition at a given vulcanization temperature. In order to compare "slow" or "fast" accelerators according to their t0 value, the reference composition used here is a composition comprising 100 phr of NR, 47 phr of carbon black N326, 0.9 phr of stearic acid, 7.5 phr of ZnO, 4.5 phr of sulfur, and the accelerator for which the t0 is to be determined, at a molar content of 2.3 mmol per 100 parts by weight of elastomer. The method for measuring the t0 is in accordance with Standard DIN-53529, at 150° C. Within the meaning of the present application, the "t0" means the t0 as defined and measured below.

For example, the table below gives the t0 of certain accelerators in the proposed formulation and with the proposed measurement method.

|  | DCBS[1] | TBBS[2] | CBS[3] | TBzTD[4] |
|---|---|---|---|---|
| Molar mass (g/mol) | 346.56 | 238.38 | 264.41 | 544.81 |
| t0 (min) | 4.8 | 3.6 | 3.0 | 1.5 |

[1]N,N'-Dicyclohexyl-2-benzothiazolesulfenamide ("Santocure DCBS" from Flexsys)
[2]N-tert-butyl-2-benzothiazylsulfenamide ("Santocure TBBS" from Flexsys)
[3]N-cyclohexyl-2-benzothiazolesulfenamide ("Santocure CBS" from Flexsys)
[4]Tetrabenzylthiuram disulfide ("TBzTD" from Akrochem)

According to the invention, the vulcanization (ultra-) accelerator has a vulcanization initiation time, referred to as "t0", of less than 3 minutes, for example less than 2.5 minutes, for example less than 2 minutes.

Advantageously, the vulcanization (ultra-)accelerator having a "t0" of less than 3 minutes is selected from the group comprising or consisting of ultra-accelerators of the type of thiurams, dithiocarbamates, dithiophosphates or xanthates and mixtures thereof. Those skilled in the art clearly understand that these (ultra-)accelerators of the type of thiurams, dithiocarbamates, dithiophosphates or xanthates and mixtures thereof are accelerators of the type of thiurams, dithiocarbamates, dithiophosphates or xanthates and mixtures thereof, and that have a "t0" of less than 3 minutes.

Particularly advantageously, the vulcanization (ultra-)accelerator having a "t0" of less than 3 minutes is selected from the group comprising or consisting of tetrabenzylthiuram disulfide (TBzTD), tetramethyl thiuram monosulfide (TMTM), tetra methyl thiuram disulfide (TMTD), tetraethyl thiuram disulfide (TETD), tetraisobutyl thiuram disulfide (TiBTD), dipentamethylene thiuram tetrasulfide (DPTT), zinc dibutyl dithiocarbamate (ZDBC), zinc diethyl dithiocarbamate, zinc dimethyl dithiocarbamate, copper dimethyl dithiocarbamate, tellurium diethyl dithiocarbamate (TDEC), zinc dibenzyl dithiocarbamate (ZBED), zinc diisononyl dithiocarbamate, zinc pentamethylene dithiocarbamate, zinc dibenzyldithiocarbamate (ZBEC), zinc isopropyl xanthate (ZIX), zinc butyl xanthate (ZBX), sodium ethyl xanthate (SEX), sodium isobutyl xanthate (SIBX), sodium isopropyl xanthate (SIPX), sodium n-butyl xanthate (SNBX), sodium amyl xanthate (SAX), potassium ethyl xanthate (PEX), potassium amyl xanthate (PAX), zinc 2-ethylhexylphosphorodithioate (ZDT/S), and the mixtures of these compounds.

Advantageously, the composition according to the invention comprises no vulcanization accelerator having a "t0" of greater than or equal to 3 minutes or comprises less than 1 phr, preferably less than 0.5 phr, thereof. Very preferentially, the composition according to the invention comprises no vulcanization accelerator having a "t0" of greater than or equal to 3 minutes. The vulcanization accelerator having a "t0" of greater than or equal to 3 minutes may be for example selected from the group comprising or consisting of accelerators of thiazole type and also derivatives thereof, accelerators of sulfenamide type, thiourea accelerators and mixtures thereof. For example, the vulcanization accelerator having a "t0" of greater than or equal to 3 minutes may be selected from the group comprising or consisting of 2-mercaptobenzothiazole disulfide (MBTS), N-cyclohexyl-2-benzothiazolesulfenamide (CBS), N,N'-dicyclohexyl-2-benzothiazolesulfenamide (DCBS), N-(tert-butyl)-2-benzothiazolesulfenamide (TBBS), N-(tert-butyl)-2-benzothiazolesulfenimide (TBSI), morpholine disulfide, N-morpholino-2-benzothiazolesulfenamide (MBS), dibutylthiourea (DBTU) and the mixtures of these compounds.

The content of vulcanization (ultra-)accelerator having a "t0" of less than 3 minutes, in the composition according to the invention, is preferentially within a range extending from 1 to 15 phr, preferably from 2 to 15 phr, preferably from 2 to 10 phr, preferably from 3 to 10, more preferably from 4 to 10 phr.

According to the invention, the ratio of the content of sulfur to the content of vulcanization (ultra-)accelerator having a "t0" of less than 3 minutes is within a range extending from 0.1 to 15, preferably from 0.2 to 10.

Various known secondary vulcanization accelerators or vulcanization activators, such as metal oxides (typically zinc oxide), derivatives of stearic acid (typically stearic acid) or equivalent compounds, or guanidine derivatives (in particular diphenylguanidine), well known to those skilled in the art may be added to this base vulcanization system, incorporated during the first non-productive phase and/or during the productive phase, as are described subsequently.

Various known secondary vulcanization accelerators or vulcanization activators, such as metal oxides (typically zinc oxide), derivatives of stearic acid (typically stearic acid) or equivalent compounds, or guanidine derivatives (in particular diphenylguanidine) may be added to this base vulcanization system, incorporated during the first non-productive phase and/or during the productive phase, as are described subsequently.

The composition according to the invention may comprise a content of metal oxide (preferably zinc oxide) of less than 7 phr. Preferably, the content of metal oxide (preferably zinc oxide) is within a range extending from 1 to 7 phr, preferably from 2 to 6 phr. The content of stearic acid derivative (i.e. of stearic acid or of a salt of stearic acid, preferentially of stearic acid) is preferably greater than 1 phr. Preferably, the content of stearic acid derivative (i.e. of stearic acid or of a salt of stearic acid, preferentially of stearic acid) is within a range extending from 1 to 3 phr and more preferentially from 1 to 2 phr.

In the present document, "stearic acid derivative" is understood to mean stearic acid or a salt of stearic acid, both being well known to those skilled in the art. By way of example of salt of stearic acid which can be used within the context of the present invention, mention may especially be made of zinc stearate or cadmium stearate.

Also described in the present document is a composition according to the invention, in which the content of sulfur is from more than 1.5 to 10 phr (and no longer from 1 to 10 phr), the content of vulcanization accelerator is from more than 3 to 15 phr (and no longer from 2 to 15 phr), and in which the ratio of the content of sulfur to the content of vulcanization accelerator is less than or equal to 1 (and no longer less than 0.55). According to this embodiment, the content of sulfur may advantageously be within a range extending from 2 to 8 phr, the content of vulcanization accelerator may advantageously be within a range extending from 4 to 12 phr, and the ratio of content of sulfur to the content of vulcanization accelerator may be less than 1, preferably within a range extending from 0.1 to 1, preferably between 0.1 and 1, more preferably between 0.1 and 0.55.

II-5 Various Additives

The rubber composition according to the invention may also comprise all or some of the usual additives known to a person skilled in the art and generally used in rubber compositions for tyres, in particular treads of tyres, such as, for example, fillers other than those mentioned above, pigments, protective agents, such as antiozone waxes, chemical antiozonants or antioxidants, anti-fatigue agents.

II-6 Preparation of the Rubber Compositions

The compositions used in the context of the present invention can be manufactured in appropriate mixers, using two successive phases of preparation well known to a person skilled in the art: a first phase of thermomechanical working or kneading ("non-productive" phase) at high temperature, up to a maximum temperature of between 110° C. and 190° C., preferably between 130° C. and 180° C., followed by a second phase of mechanical working ("productive" phase) down to a lower temperature, typically of less than 110° C., for example between 40° C. and 100° C., during which finishing phase the crosslinking system is incorporated.

The process for preparing such compositions comprises, for example, the following steps:

a) incorporating a reinforcing filler in a diene elastomer during a first step ("non-productive" step), everything being kneaded thermomechanically (for example, in one or more goes), until a maximum temperature of between 110° C. and 190° C. is reached;
b) cooling the combined mixture to a temperature of less than 100° C.;
c) subsequently incorporating, during a second step ("productive" step), a crosslinking system;
d) kneading everything up to a maximum temperature of less than 110° C.

The reinforcing resin can be introduced either during the non-productive phase (a) or during the productive phase (c). When the composition additionally comprises a co-agent of the reinforcing resin, the reinforcing resin is preferentially introduced during the non-productive phase (a) and the co-agent of the reinforcing resin during the productive phase (c).

By way of example, the non-productive phase is carried out in a single thermomechanical step during which, firstly all the necessary base constituents (diene elastomer, reinforcing filler, reinforcing resin) are introduced into an appropriate mixer, such as a standard internal mixer, followed, secondly, for example after kneading for one to two minutes, by the other additives, optional additional agents for covering the filler or optional additional processing aids, with the exception of the crosslinking system. The total duration of the kneading, in this non-productive phase, is preferably between 1 and 15 min.

The first step of kneading is generally carried out by incorporating the reinforcing filler in the elastomer, in one or more goes, while kneading thermomechanically. In the case where the reinforcing filler, in particular the carbon black, is already incorporated, completely or partly, in the elastomer in the form of a masterbatch, as is described, for example, in Applications WO 97/36724 or WO 99/16600, it is the masterbatch which is directly kneaded and, if appropriate, the other elastomers or reinforcing fillers present in the composition which are not in the masterbatch form, and also the additives other than the crosslinking system, are incorporated.

After cooling the mixture thus obtained, the crosslinking system and, if appropriate, the co-agent of the reinforcing resin are then incorporated in an external mixer, such as an open mill, maintained at a low temperature (for example between 40° C. and 100° C.). The combined mixture is then mixed (productive phase) for a few minutes, for example between 2 and 15 min.

The final composition thus obtained can subsequently be calendered, for example in the form of a sheet or of a slab, in particular for a laboratory characterization, or else extruded, for example in order to form a rubber profiled element used in the manufacture of a tyre.

The curing can be carried out, in a way known to a person skilled in the art, at a temperature generally of between 130° C. and 200° C., under pressure, for a sufficient time which can vary, for example, between 5 and 90 min as a function in particular of the curing temperature, of the crosslinking system adopted, of the kinetics of crosslinking of the composition under consideration or also of the size of the tyre comprising an abovementioned profiled element.

II-7 Finished or Semi-Finished Rubber Article and Tyre

Another subject of the present invention is a finished or semi-finished rubber article comprising a composition according to the invention.

Another subject of the present invention is a tyre comprising a composition according to the invention or a semi-finished rubber article according to the invention.

The invention relates in particular to tyres intended to equip motor vehicles of passenger vehicle type, SUVs ("Sport Utility Vehicles"), or two-wheel vehicles (in particular motorcycles), or aircraft, or else industrial vehicles chosen from vans, heavy-duty vehicles—that is to say, underground trains, buses, heavy road transport vehicles (lorries, tractors, trailers) or off-road vehicles, such as heavy agricultural vehicles or earthmoving equipment —, and others.

The composition defined in the present description is particularly well suited to the tread.

Thus, in the tyre according to the present invention, the composition may be present in (at least) the tread of the tyre.

The invention relates to the tyres and semi-finished products for tyres described above, articles made of rubber, both in the uncured state (i.e. before curing) and in the cured state (i.e. after crosslinking or vulcanization).

III— EXAMPLES

III-1 Measurements and Tests Used

Dynamic Properties (Dynamic Shear Modulus (G*))

The dynamic properties G* are measured on a viscosity analyser (Metravib V A4000) according to Standard ASTM D 5992-96. The response of a sample of desired vulcanized composition (cylindrical test specimen with a thickness of 2 mm and a cross section of 78.5 mm$^2$), subjected to a simple alternating sinusoidal shear stress, at a frequency of 10 Hz, under an applied stress of 0.7 MPa while varying the temperature from −50° C. to +100° C. according to Standard ASTM D 1349, is recorded. The modulus G* at 23° C. is extracted from the results obtained in order to describe the stiffness of the vulcanized compositions.

III-2 Preparation of the Compositions

The tests which follow are carried out in the following way: the diene elastomer, the reinforcing filler, the reinforcing resin and also the various other ingredients, with the exception of the crosslinking system and of the co-agent of the reinforcing resin, are successively introduced into an internal mixer (final degree of filling: approximately 70% by volume), the initial vessel temperature of which is approximately 60° C. Thermomechanical working is then performed (non-productive phase) in one step, which lasts in total for approximately 3 to 4 min, until a maximum "dropping" temperature of 165° C. is reached.

The mixture thus obtained is recovered and cooled and then sulfur, a vulcanization ultra-accelerator and the co-agent of the reinforcing resin are incorporated on a mixer (homofinisher) at 30° C., everything being mixed (productive phase) for an appropriate time (for example between 5 and 12 min).

The compositions thus obtained are subsequently calendered, either in the form of slabs (thickness of 2 to 3 mm) or of thin sheets of rubber, for the measurement of their physical or mechanical properties, or extruded in the form of a profiled element.

The samples thus produced were cured for 25 minutes at 150° C. or 90 minutes at 160° C. in a bell-shaped press.

III-3 Rubber Test

The objective of the examples presented in Table 1 is to compare the stiffness of compositions in accordance with the invention (I1 to I16.) to that of control compositions comprising a conventional vulcanization system (C1 to C19) which differ respectively from the compositions in accordance with the present invention in that the (ultra-)accelerator having a t0 of less than 3 minutes has been replaced by a vulcanization accelerator having a "t0" of greater than or equal to 3 minutes. Their formulations (in phr) and their properties have been summarized in Tables 1 to 3 below.

TABLE 1

| Formulations | C1 | I1 | C2 | I2 | C3 | I3 | C4 | I4 | C5 | I5 | C6 | I6 |
|---|---|---|---|---|---|---|---|---|---|---|---|---|
| NR[a] | 100 | 100 | 100 | 100 | 100 | 100 | 100 | 100 | 100 | 100 | 100 | 100 |
| Resin 1[c] | 7 | 7 | 7 | 7 | 7 | 7 | 7 | 7 | 7 | 7 | 7 | 7 |
| Co-agent 1[d] | 14 | 14 | 14 | 14 | 14 | 14 | 14 | 14 | 14 | 14 | 14 | 14 |
| Sulfur | 2 | 2 | 4 | 4 | 6 | 6 | 2 | 2 | 4 | 4 | 6 | 6 |
| Ultra-accelerator[g] | — | 1 | — | 2 | — | 3 | — | 4 | — | 8 | — | 12 |
| Accelerator[h] | 1 | — | 2 | — | 3 | — | 4 | — | 8 | — | 12 | — |
| N326[i] | 75 | 75 | 75 | 75 | 75 | 75 | 75 | 75 | 75 | 75 | 75 | 75 |
| Rosin[j] | 3.5 | 3.5 | 3.5 | 3.5 | 3.5 | 3.5 | 3.5 | 3.5 | 3.5 | 3.5 | 3.5 | 3.5 |
| Oil[k] | 3.5 | 3.5 | 3.5 | 3.5 | 3.5 | 3.5 | 3.5 | 3.5 | 3.5 | 3.5 | 3.5 | 3.5 |
| Antiozone wax[l] | 1.5 | 1.5 | 1.5 | 1.5 | 1.5 | 1.5 | 1.5 | 1.5 | 1.5 | 1.5 | 1.5 | 1.5 |
| Antioxidant[m] | 2.5 | 2.5 | 2.5 | 2.5 | 2.5 | 2.5 | 2.5 | 2.5 | 2.5 | 2.5 | 2.5 | 2.5 |
| ZnO[n] | 3 | 3 | 3 | 3 | 3 | 3 | 3 | 3 | 3 | 3 | 3 | 3 |
| Stearic acid[o] | 1.5 | 1.5 | 1.5 | 1.5 | 1.5 | 1.5 | 1.5 | 1.5 | 1.5 | 1.5 | 1.5 | 1.5 |
| Properties | | | | | | | | | | | | |
| G* modulus at 23° C. | 8 | 76 | 24 | 73 | 29 | 80 | 15 | 86 | 28 | 86 | 30 | 86 |

[a] Natural rubber
[c] Novolak phenol-formaldehyde resin, Peracit 4536K, from Perstorp
[d] Hexa(methoxymethyl)melamine methylene donor (WESTCO HMMM) from Western Reserve Chemical
[g] TBzTD: Tetrabenzylthiuram disulfide, TBzTD, from Akrochem
[h] N-Cyclohexyl-2-benzothiazolesulfenamide, Santocure CBS, from Flexsys
[i] Carbon black N326 (name according to Standard ASTM D-1765)
[j] Rosin resin (Abalyn™) from Eastman
[k] MES/HPD oil, Flexon 863, from Exxon Mobil
[l] Antiozone wax, Varazon 4959, from Sasol Wax
[m] N-(1,3-Dimethylbutyl)-N'-phenyl-p-phenylenediamine, Santoflex 6-PPD, from Flexsys
[n] Zinc oxide (industrial grade - Umicore)
[o] Stearin, Pristerene 4931 from Uniqema

TABLE 2

| Formulations | C7 | I7 | C8 | I8 | C9 | I9 | C10 | I10 | C11 | I11 |
|---|---|---|---|---|---|---|---|---|---|---|
| SBR[b] | 100 | 100 | 100 | 100 | 100 | 100 | 100 | 100 | 100 | 100 |
| Resin 1[c] | 7 | 7 | 7 | 7 | 7 | 7 | 7 | 7 | 7 | 7 |
| Co-agent 1[d] | 14 | 14 | 14 | 14 | 14 | 14 | 14 | 14 | 14 | 14 |
| Sulfur | 2 | 2 | 4 | 4 | 6 | 6 | 2 | 2 | 4 | 4 |
| Ultra-accelerator[g] | — | 1 | — | 2 | — | 3 | — | 4 | — | 8 |
| Accelerator[h] | 1 | — | 2 | — | 3 | — | 4 | — | 8 | — |
| N326[i] | 75 | 75 | 75 | 75 | 75 | 75 | 75 | 75 | 75 | 75 |
| Rosin[j] | 3.5 | 3.5 | 3.5 | 3.5 | 3.5 | 3.5 | 3.5 | 3.5 | 3.5 | 3.5 |
| Oil[k] | 3.5 | 3.5 | 3.5 | 3.5 | 3.5 | 3.5 | 3.5 | 3.5 | 3.5 | 3.5 |
| Antiozone wax[l] | 1.5 | 1.5 | 1.5 | 1.5 | 1.5 | 1.5 | 1.5 | 1.5 | 1.5 | 1.5 |
| Antioxidant[m] | 2.5 | 2.5 | 2.5 | 2.5 | 2.5 | 2.5 | 2.5 | 2.5 | 2.5 | 2.5 |
| ZnO[n] | 3 | 3 | 3 | 3 | 3 | 3 | 3 | 3 | 3 | 3 |
| Stearic acid[o] | 1.5 | 1.5 | 1.5 | 1.5 | 1.5 | 1.5 | 1.5 | 1.5 | 1.5 | 1.5 |
| Properties | | | | | | | | | | |
| G* modulus at 23° C. | 6 | 48 | 18 | 38 | 24 | 35 | 16 | 35 | 24 | 45 |

[c], [d] and [g] to [o] are identical to Table 1
[b] Styrene-butadiene copolymer with 26% of styrene units and 24% of 1,2-units of the butadiene part (Tg –48° C.)

TABLE 3

| Formulations | C12 | I12 | C13 | I13 | C14 | I14 | C15 | I15 | C16 | I16 |
|---|---|---|---|---|---|---|---|---|---|---|
| NR[a] | 100 | 100 | 100 | 100 | 100 | 100 | — | — | — | — |
| SBR[b] | — | — | — | — | — | — | 100 | 100 | 100 | 100 |
| Resin 2[e] | 7.5 | 7.5 | 7.5 | 7.5 | 7.5 | 7.5 | 7.5 | 7.5 | 7.5 | 7.5 |
| Co-agent 2[f] | 16 | 16 | 16 | 16 | 16 | 16 | 16 | 16 | 16 | 16 |
| Sulfur | 8 | 8 | 8 | 8 | 8 | 8 | 8 | 8 | 8 | 8 |
| Ultra-accelerator[g] | — | 1.3 | — | 5 | — | 8 | — | 1.3 | — | 5 |
| Accelerator[h] | 1.3 | — | 5 | — | 8 | — | 1.3 | — | 5 | — |
| N326[i] | 75 | 75 | 75 | 75 | 75 | 75 | 75 | 75 | 75 | 75 |
| Rosin[j] | 3.5 | 3.5 | 3.5 | 3.5 | 3.5 | 3.5 | 3.5 | 3.5 | 3.5 | 3.5 |
| Oil[k] | 3.5 | 3.5 | 3.5 | 3.5 | 3.5 | 3.5 | 3.5 | 3.5 | 3.5 | 3.5 |
| Antiozone wax[l] | 1.5 | 1.5 | 1.5 | 1.5 | 1.5 | 1.5 | 1.5 | 1.5 | 1.5 | 1.5 |
| Antioxidant[m] | 2.5 | 2.5 | 2.5 | 2.5 | 2.5 | 2.5 | 2.5 | 2.5 | 2.5 | 2.5 |

TABLE 3-continued

| Formulations | C12 | I12 | C13 | I13 | C14 | I14 | C15 | I15 | C16 | I16 |
|---|---|---|---|---|---|---|---|---|---|---|
| ZnO[n] | 3 | 3 | 3 | 3 | 3 | 3 | 3 | 3 | 3 | 3 |
| Stearic acid[o] | 1.5 | 1.5 | 1.5 | 1.5 | 1.5 | 1.5 | 1.5 | 1.5 | 1.5 | 1.5 |
| Properties | | | | | | | | | | |
| G* modulus at 23° C. | 18 | 95 | 40 | 92 | 51 | 100 | 22 | 49 | 53 | 56 |

[a] and [g] to [o] are identical to Table 1
[b] is identical to Table 2
[e]Epoxy resin, Araldite ECN 1299 CH, from Huntsman
[f]Amino curing agent, Ethacure 300, from Albemarle The results presented in Tables 1 to 3 show that the compositions in accordance with the invention, using a vulcanization (ultra-)accelerator having a t0 of less than 3 minutes, make it possible to improve the stiffness of the compositions having the same content of sulfur, of reinforcing resin and of co-agent of the reinforcing resin. This effect was demonstrated for various diene elastomers and various reinforcing resin/co-agent of reinforcing resin pairs.

The invention claimed is:

1. A rubber composition based on at least:
a diene elastomer, the diene elastomer being a highly unsaturated diene elastomer selected from the group consisting of a polybutadiene, a butadiene/styrene copolymer, natural rubber, and mixtures thereof;
a reinforcing filler;
from 1 to 45 parts by weight, per hundred parts by weight of elastomer, phr, of a reinforcing resin;
from 1 to 10 phr of sulfur; and
from 2 to 15 phr of vulcanization ultra-accelerator having a vulcanization initiation time t0 of less than 3 minutes,
wherein the rubber composition comprises no vulcanization accelerator having a t0 of greater than or equal to 3 minutes or the rubber composition comprises less than 2 phr vulcanization accelerator having a t0 of greater than or equal to 3 minutes,
wherein the vulcanization ultra-accelerator is selected from the group consisting of tetrabenzylthiuram disulfide (TBzTD), zinc dibutyl dithiocarbamate (ZDBC), zinc dibenzyl dithiocarbamate (ZBED), zinc diisononyl dithiocarbamate, zinc pentamethylene dithiocarbamate, zinc dibenzyldithiocarbamate (ZBEC), zinc 2-ethylhexylphosphorodithioate (ZDT/S), and mixtures thereof, and
wherein the rubber composition does not comprise butyl rubber.

2. The rubber composition according to claim 1, wherein the content of sulfur is within a range extending from 1 to 8 phr.

3. The rubber composition according to claim 1, wherein the vulcanization ultra-accelerator is tetrabenzylthiuram disulfide (TBzTD).

4. The rubber composition according to claim 1, wherein the vulcanization ultra-accelerator has a t0 of less than 2.5 minutes.

5. The rubber composition according to claim 1, wherein the content of vulcanization ultra-accelerator is within a range extending from 2 to 10 phr.

6. The rubber composition according to claim 1, wherein the ratio of the content of sulfur to the content of vulcanization ultra-accelerator is within a range extending from 0.1 to 15.

7. The rubber composition according to claim 1, wherein the rubber composition comprises no vulcanization accelerator having a t0 of greater than or equal to 3 minutes or the rubber composition comprises less than 0.5 phr of a vulcanization accelerator having a t0 of greater than or equal to 3 minutes.

8. The rubber composition according to claim 7, wherein the vulcanization accelerator having a t0 of greater than or equal to 3 minutes is selected from the group consisting of accelerators of thiazole type, derivatives of accelerators of thiazole type, accelerators of sulfenamide type, thiourea accelerators and mixtures thereof.

9. The rubber composition according to claim 1, wherein the reinforcing filler predominantly comprises carbon black.

10. The rubber composition according to claim 1, wherein the content of reinforcing filler is within a range extending from 50 to 120 phr.

11. The rubber composition according to claim 1, wherein the content of reinforcing resin is within a range extending from 2 to 20 phr.

12. The rubber composition according to claim 1, wherein the reinforcing resin is selected from the group consisting of phenolic resins, epoxy resins, benzoxazine resins, bismaleimides, polyurethane resins and mixtures thereof.

13. The rubber composition according to claim 1, wherein the reinforcing resin is a phenolic resin selected from the group consisting of resins based on polyphenol, on alkylphenol, on aralkylphenol and mixtures thereof.

14. The rubber composition according to claim 1, wherein the reinforcing resin is an epoxy resin selected from the group consisting of aromatic epoxy compounds, alicyclic epoxy compounds, aliphatic epoxy compounds and mixtures thereof.

15. The rubber composition according to claim 1 further comprising a co-agent of the reinforcing resin.

16. The rubber composition according to claim 15, wherein the content of co-agent of the reinforcing resin is within a range extending from 0.5 to 20 phr.

17. The rubber composition according to claim 15, wherein the co-agent of the reinforcing resin is selected from the group consisting of methylene donors, polyaldehydes, polyamines, polyimines, polyamines, polyaldimines, polyketimines, acid anhydrides and mixtures thereof.

18. A tire comprising the rubber composition according to claim 1, wherein the rubber composition is present in at least the tread of the tire.

* * * * *